United States Patent [19]

Altermatt

[11] Patent Number: 4,845,220

[45] Date of Patent: Jul. 4, 1989

[54] VATTABLE 2-ARYL-4,6-DIAMINOPYRIMIDINES

[76] Inventor: Hans Altermatt, Schönenbachstrasse 22, 4153 Reinach, Switzerland

[21] Appl. No.: 139,562

[22] Filed: Dec. 30, 1987

[30] Foreign Application Priority Data

Jan. 9, 1987 [CH] Switzerland ............... 67/87

[51] Int. Cl.$^4$ .................... C07D 239/48; C07D 239/70
[52] U.S. Cl. ................................ 544/294; 544/296; 544/248; 544/246; 544/326; 544/327; 544/328; 544/329
[58] Field of Search .............. 544/272, 296, 248, 246, 544/294, 326, 327, 328, 329

[56] References Cited

U.S. PATENT DOCUMENTS

| | | | |
|---|---|---|---|
| 3,108,105 | 10/1963 | Staeuble ........................... | 544/294 |
| 3,642,795 | 2/1972 | Ulrich .............................. | 260/249 |
| 3,772,296 | 11/1973 | Ulrich et al. .................... | 260/256.4 |

FOREIGN PATENT DOCUMENTS 569796 2/1933 Fed. Rep. of Germany .

*Primary Examiner*—John M. Ford
*Attorney, Agent, or Firm*—Wenderoth, Lind & Ponack

[57] ABSTRACT

The invention relates to vattable 2-aryl-4,6-diaminopyrimidines of formula

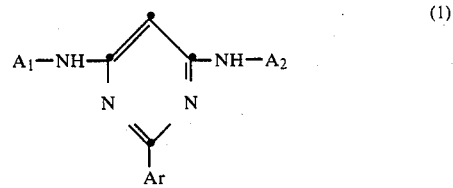

(1)

wherein
$A_1$ and $A_2$ are identical or different vattable radicals, and
Ar is an aryl radical.

These pyrimidines are particularly suitable vat dyes for dyeing or printing textile fibres made from natural or regenerated cellulose. They give light- and wetfast orange, red or violet dyeings.

6 Claims, No Drawings

VATTABLE 2-ARYL-4,6-DIAMINOPYRIMIDINES

The present invention relates to vattable 2-aryl-4,6-diaminopyrimidines, to their preparation and to the use thereof as vat dyes.

The pyrimidines of this invention have the general formula

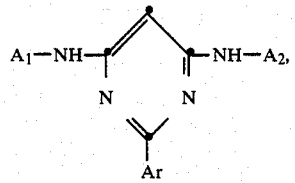     (1)

wherein
$A_1$ and $A_2$ are identical or different vattable radicals, and
Ar is an aryl radical.

The vattable radicals $A_1$ and $A_2$ are preferably derived from polycyclic quinoid compounds preferably containing 3 to 6 fused rings, for example anthraquinones, phthaloylacridones, anthrones, benzanthrones, anthanthrones, anthrimides, anthrapyridines, anthrapyrimidines, anthrapyridones, anthrapyrimidones, azabenzanthrones, isothiazolanthrones or pyrazolanthrones. Of these compounds, the anthraquinones and phthaloylacridones are preferred.

All the above vattable radicals can carry the customary substituents. Examples of such substituents are: halogen, trifluoromethyl, lower alkyl, lower alkoxy, lower alkylthio, lower alkylcarbonyl, lower alkoxycarbonyl, amino, mono-lower alkylamino, di-lower alkylamino, acylamino, phenyl, phenylamino, phenoxy or phenylthio.

The aryl radical Ar is typically phenyl, biphenylyl or naphthyl. These aryl radicals may be substituted by halogen, hydroxy, cyano, nitro, lower alkyl, lower alkoxy, lower alkylcarbonyl or lower alkoxycarbonyl. Ar is preferably phenyl, chlorophenyl, bromophenyl, methoxyphenyl, tolyl or xylyl.

Lower alkyl, lower alkoxy and lower alkylthio usually denote those groups or moieties that contain 1 to 5, preferably 1 to 3, carbon atoms. Examples of such groups are: methyl, ethyl, n-propyl, isopropyl, n-butyl, sec-butyl, tert-butyl, amyl or isoamyl; methoxy, ethoxy, isopropoxy, isobutoxy, tert-butoxy, or tert-amyloxy; and methylthio, ethylthio, propylthio or butylthio.

The acyl moiety of acylamino is preferably formyl, lower alkylcarbonyl such as acetyl or propionyl or, in particular, benzoyl. Further acyl moieties may be lower alkylsulfonyl such as methylsulfonyl or ethylsulfonyl as well as phenylsulfonyl. Benzoyl and phenylsulfonyl can be substituted by halogen, methyl, methoxy, ethoxy or phenyl. Acylamino may also suitably be thiophenecarbonylamino.

Halogen is typically fluorine, bromine or, preferably, chlorine.

Preferred quinoid 2-aryl-4,6-diaminopyrimidines have the formula

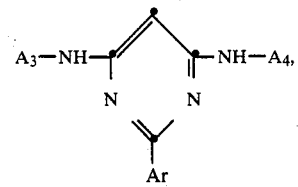     (2)

wherein Ar is as defined above and $A_3$ and $A_4$ are each independently of the other an unsubstituted or substituted 3,4-phthaloylacridonyl radical which is attached to —NH— in 2-position, or an unsubstituted or substituted anthraquinonyl radical which is attached to —NH— in 1- or 2-position.

The anthraquinonyl radical as well as the phthaloylacridonyl radical may contain one or more substituents. Possible substituents are halogen atoms, lower alkyl, lower alkoxy, lower alkylcarbonyl or lower alkoxycarbonyl radicals, amino, mono-lower alkylamino, di-lower alkylamino or acylamino groups or also fused benzene rings.

Among the pyrimidine compounds of formula (2), those compounds are of particular interest in which $A_3$ and $A_4$ are the 3,4-phthaloylacridonyl radical or an anthraquinonyl radical which is unsubstituted or substituted by halogen, lower alkyl, lower alkoxy, lower alkylcarbonyl or acylamino and is attached to —NH— in 1-position.

Useful vattable pyrimidine derivatives have the formula

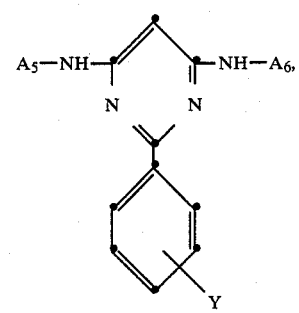     (3)

wherein $A_5$ and $A_6$ are each a 1-anthraquinonyl radical which is unsubstituted or substituted by halogen, methyl, methoxy, acetyl, acetylamino or benzoylamino, or a 3,4-phthaloylacridonyl radical which is attached to —NH— in 2-position, and Y is hydrogen, bromine, chlorine, methyl or methoxy.

The pyrimidine derivatives of formula (1) are prepared by reacting a 2-aryl-4,6-diaminopyrimidine of formula

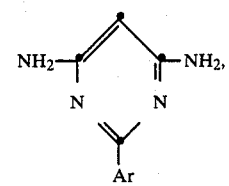     (4)

wherein Ar has the given meaning, with vattable compounds of formulae $A_1$—$Hal_1$     (5)

and $$A_2—Hal_2 \quad (6)$$

wherein $A_1$ and $A_2$ have the given meanings and $Hal_1$ and $Hal_2$ are each independently of the other a halogen atom, e.g. fluorine or, preferably, bromine or chlorine.

The reaction of the 2-aryl-4,6-diaminopyrimidine with the vattable compounds of formulae (5) and (6) can be carried out in a single step or in a two-step reaction.

The reaction is preferably carried out in the presence of an acid acceptor, e.g. an alkali metal hydroxide, alkali metal bicarbonate, alkali metal carbonate, or of a tertiary nitrogen base such as pyridine or a trialkylamine, and in the presence of a copper compound as catalyst, e.g. copper(I) chloride, copper(I) bromide, copper(I) iodide or, preferably, an adduct of these metal halides and a tertiary nitrogen base, e.g. triethylamine, N-methylpiperidine or, in particular, pyridine. The preferred catalyst is the copper(I) iodide/pyridine complex described in DE-C-1 795 102.

The reaction preferably takes place in an inert, high-boiling organic solvent and at elevated temperature, preferably in the range from 110° to 230° C., preferably from 150° to 200° C.

Suitable solvents are in particular nitrobenzene or a chlorobenzene such as dichlorobenzene or trichlorobenzene. The preferred solvent is nitrobenzene.

Suitable starting 2-aryl-4,6-diaminopyrimidines of formula (4) are typically: 2-phenyl-4,6-diaminopyrimidine, 2-(p-tolyl)-4,6-diaminopyrimidine, 2-(2'-methoxyphenyl)-4,6-diaminopyrimidine, 2-(3'-chlorophenyl)-4,6-diaminopyrimidine, 2-(4'-bromophenyl)-4,6-diaminopyrimidine, 2-(2'-hydroxynaphthyl-1')-4,6-diaminopyrimidine, 2-biphenylyl-4,6-diaminopyrimidine or 2-(naphthyl-1')-4,6-diaminopyrimidine.

Suitable vattable halogen compounds of formulae (5) and (6) are preferably those in which the halogen atoms $Hal_1$ and $Hal_2$ are chlorine or bromine. Representative examples of vattable halogen compounds of formulae (5) and (6) are:

1-chloroanthraquinone, 1,3-dichloroanthraquinone, 1,6-dichloroanthraquinone, 1,8-dichloroanthraquinone, 1-bromoanthraquinone, 1,5-dibromoanthraquinone, 1,8-dibromoanthraquinone, 2-chloroanthraquinone, 2,6-dichloroanthraquinone, 2,7-dichloroanthraquinone, 2-bromoanthraquinone, 2,6-dibromoanthraquinone, 2,7-dibromoanthraquinone, 1-chloro-5-acetylaminoanthraquinone, 1-chloro-4-benzoylaminoanthraquinone, 1-chloro-4-(p-chlorobenzoylamino)anthraquinone, 1-bromo-4-benzoylaminoanthraquinone, 1-bromo-4-(4'-phenylbenzoylamino)anthraquinone, 1-chloro-5-benzoylaminoanthraquinone, 1-chloro-5-(p-chlorobenzoylamino)anthraquinone, 1-bromo-5-benzoylaminoanthraquinone, 1-chloro-2-methylaminoanthraquinone, 1-chloro-4-methylanthraquinone, 1-chloro-4-methoxyanthraquinone, 1-bromo-2-methoxyanthraquinone, 1-bromo-4-methoxyanthraquinone, 1-chloro-3-acetyl-4-aminoanthraquinone, 1-chloro-4-anilinoanthraquinone, 1-chloro-4-phenylthioanthraquinone, 1-chloro-5-phenylthioanthraquinone, 2-chloro-3,4-phthaloylacridone, 2,5,7-trichloro-3,4-phthaloylacridone, dichloroanthanthrone, dibromoanthanthrone.

The substituted pyrimidine compounds of formula (1) are coloured and are vat dyes which are suitable for dyeing or printing a very wide range of materials in orange, red or violet shades. The novel vat dyes are especially useful for dyeing or printing fibres made from natural or regenerated cellulose in the presence of a customary reducing agent such as dithionite. The dyes have very good build-up. The fastness properties are in general very good, especially the fastness to light, water, chlorine and boiling soda.

Surprisingly, compared with analogous vattable compounds which contain a triazine radical in place of the central pyrimidine radical, the vattable 2-arylpyrimidines of this invention are distinguished by a bathochromic effect.

The novel compounds can also be used as pigments. Owing to their useful properties, they can be used for a very wide range of pigment applications, e.g. in finely particulate form for colouring artificial silk, viscose or cellulose ethers or esters, or polyamides or polyurethanes or polyesters in the spinning solutions/melts, as well as for the preparation of coloured varnishes or lake formers, solutions or products made from acetyl cellulose, nitrocellulose, natural resins or synthetic resins, such as polymerisation resins or condensation resins, e.g. aminoplasts, alkyd resins, phenolic plastics, polyolefins such as polystyrene, polyvinyl chloride, polyethylene, polypropylene, polyacrylonitrile, rubber, casein, silicone or silicone resins.

In the following Examples parts and percentages are by weight.

EXAMPLE 1

1.9 g of 4,6-diamino-2-phenylpyrimidine, 8.5 g of 1-bromo-4-benzoylaminoanthraquinone and 2.5 g of calcined sodium carbonate are charged to 60 ml of nitrobenzene. After addition of a solution of 0.3 g of copper(I) iodide in 2 ml of pyridine, the reaction mixture is heated, with stirring, to 180° C. and then cooled after 6 hours to 70° C. The precipitate is isolated by filtration and washed with nitrobenzene. The crude product is washed first with methanol, then with water, and subsequently extracted by boiling in 5% nitric acid and dried. Yield: 5.2 g of a violet compound of formula

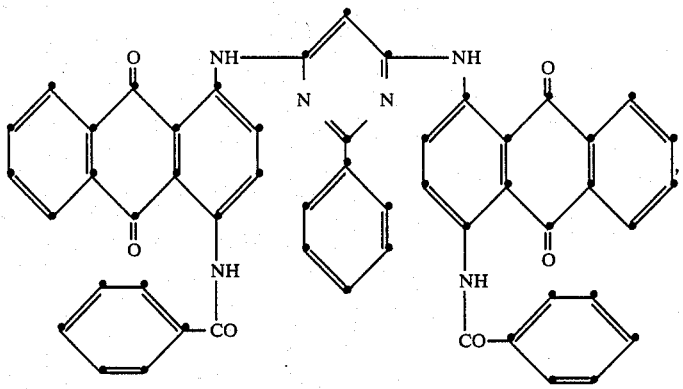

(11)

which dyes cotton by the vat dyeing method in violet shades.

EXAMPLE 2

The procedure of Example 1 is repeated, replacing 1-bromo-4-benzoylaminoanthraquinone by 7.6 g of 1-chloro-5-benzoylaminoanthraquinone, to give 5.8 g of an orange-red compound of formula

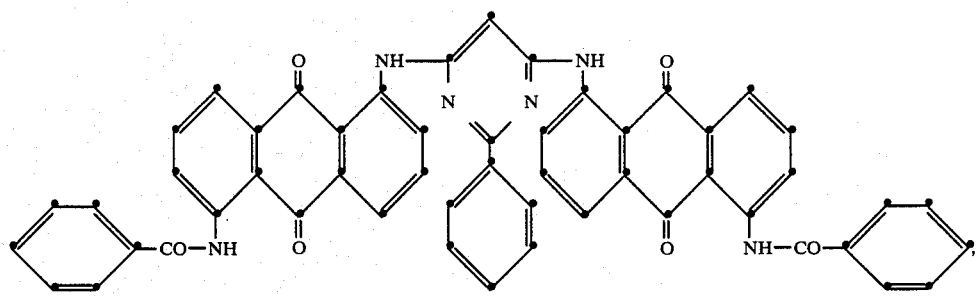

(12)

which dyes cotton by the vat dyeing method in orange-red shades.

EXAMPLE 3

The procedure of Example 1 is repeated, replacing 1-bromo-4-benzoylaminoanthraquinone by 8.4 g of 2-bromo-3,4-phthaloylacridone, to give 5.4 g of a blue compound of formula

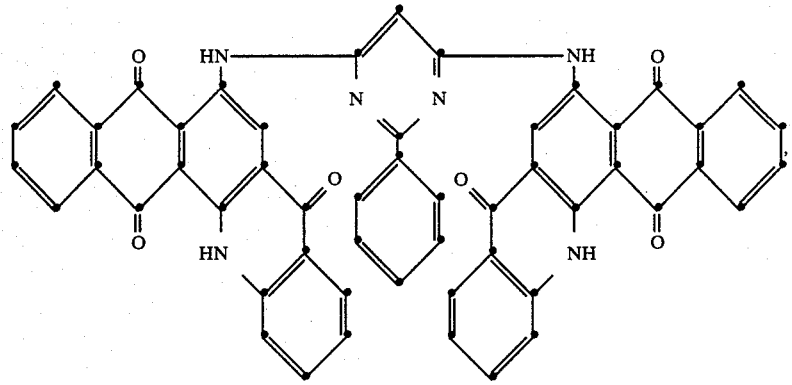

(13)

with dyes cotton by the vat dyeing method in greenish-blue shades.

EXAMPLE 4

0.3 g of copper powder, 0.6 g of iodine and 7.5 ml of pyridine are charged to 75 ml of nitrobenzene and the mixture is stirred for 1 hour at 90° C. Then 325 ml of nitrobenzene, 50 g of 1-chloroanthraquinone and 18.6 g of 4,6-diamino-2-phenylpyrimidine are added. The reaction mixture is heated to 180° C. and stirred for 6 hours at this temperature. After cooling, the precipitate is worked up as described in Example 1, to give 37 g of an orange compound of formula

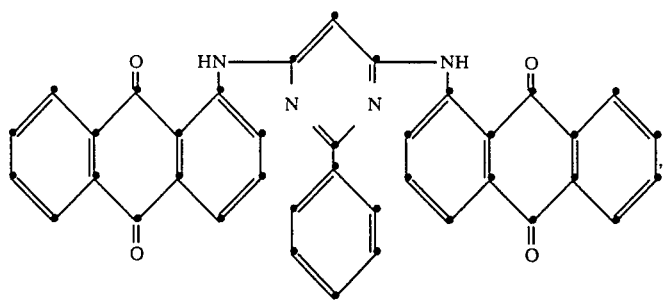

(14)

which dyes cotton by the vat dyeing method in orange shades.

Dyes which each dye cotton by the vat dyeing method in the same shades are obtained by using in Examples 1 to 4 the corresponding amount of 4,6-diamino-2-(4'-methylphenyl)pyrimidine in place of 4,6-diamino-2-phenylpyrimidine.

Further dyes which each dye cotton by the vat dyeing method in a slightly hypsochromic shade are obtained by replacing 4,6-diamino-2-phenylpyrimidine in Examples 1 to 4 by the corresponding amount of 4,6-diamino-2-(4'-bromophenyl)pyrimidine.

DYEING PROCEDURE 1 g of the dye of formula (11) is vatted at 50° to 70° C. with 10 ml of an aqueous solution of sodium hydroxide of 36° Bé and 5 g of sodium dithionite in 200 g of water. This stock vat is added to a dyebath which contains, in 2000 g of water, 5 ml of sodium hydroxide solution of 36° Bé and 3.7 g of sodium dithionite, and 100 g of cotton are put into this bath at 50° C. After 10 minutes, 15 g of sodium chloride are added, followed by the addition of a further 15 g after 20 minutes, and dyeing is carried out for 45 minutes at 40° C. The cotton is subsequently pinched off, oxidised, and finished in conventional manner. A fast violet dyeing is obtained.

PIGMENT COLOURATION 5 g of the dye of formula (14) obtained according to Example 4 are mixed with 95 g of dioctyl phthalate and the mixture is ground in a ball mill until the particle size is smaller than 3μ.

0.8 g of the resultant dioctyl phthalate paste is mixed with 13 g of polyvinyl chloride, 7 g of dioctyl phthalate and 0.1 g of cadmium stearate and the mixture is rolled for 5 minutes at 140° C. on a two-roll mill. The sheet so obtained is coloured in an orange shade of good migration properties and good lightfastness.

VARNISH COLOURATION 10 g of titanium dioxide and 2 g of the pyrimidine derivative of formula (11) obtained according to Example 1 are ground for 48 hours in a ball mill with a mixture of 26.4 g of coconut alkyd resin, 24.0 g of melamine/formaldehyde resin (50% solids content), 8.8 g of ethylene glycol monomethyl ether, and 28.8 g of xylene. The varnish so obtained is sprayed on to an aluminium sheet, predried for 30 minutes at room temperature, and then stoved for 30 minutes at 120° C. The clear violet finish obtained has good tinctorial strength and exhibits good fastness to overspraying, excellent lightfastness and good fastness to weathering.

What is claimed is:

1. A vattable 2-aryl-4,6-diaminopyrimidine of the formula

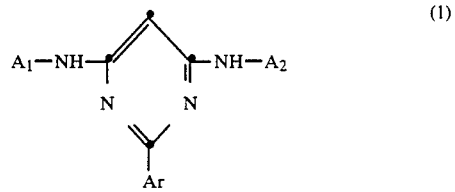

(1)

wherein
$A_1$ and $A_2$ are identical or different vattable radicals selected from the group consisting of an anthraquinone, a phthaloylacridone, an anthrone, a benzanthrone, an anthanthrone, and anthrimide, an anthrapyridine, an anthrapyrimidine, an anthrapyridone, an anthrapyrimidone, an azabenzanthrone, an isothiazolanthrone, or a pyrazolanthrone, said vattable radicals being unsubstituted or substituted by (1) halogen, (2) trifluoromethyl, (3) lower alkyl, (4) lower alkoxy, (5) lower alkylthio, (6) lower alkylcarbonyl, (7) lower alkoxycarbonyl, (8) amino, (9) mono-lower alkylamino, (10) di-lower alkylamino, (11) formylamino, (12) lower alkylcarbonyl amino, (13) benzoylamino, (14) benzoylamino wherein the benzoyl is substituted by halogen, methyl, methoxy, ethoxy or phenyl, (15) lower alkylsulfonyl amino, (16) phenylsulfonyl amino, or (17) phenylsulfonyl amino wherein the phenyl is substituted by halogen, methyl, methoxy, ethoxy or phenyl and Ar is an aryl radical selected from the group consisting of phenyl, biphenylyl or naphthyl each of said aryl radicals being unsubstituted or substituted by halogen, hydroxy, cyano, nitro, lower alkyl, lower alkoxy, lower alkylcarbonyl or lower alkoxycarbonyl.

2. A pyrimidine according to claim 1 of the formula

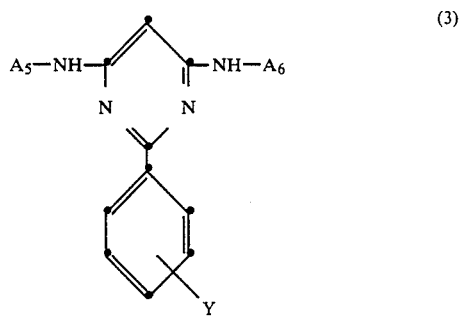

(3)

wherein $A_5$ and $A_6$ are each a 1-anthraquinonyl radical which is unsubstituted or substituted by halogen, methyl, methoxy, acetyl, acetylamino or benzoylamino, or a 3,4-phthaloylacridonyl radical which is attached to —NH— in 2-position, and Y is hydrogen, bromine, chlorine, methyl or methoxy.

3. A pyrimidine according to claim 5, wherein $A_5$ and $A_6$ are each the 4- or 5-benzoylamino-1-anthraquinonyl radical and Y is hydrogen.

4. A pyrimidine according to claim 5, wherein $A_5$ and $A_6$ are each the 3,4-phthaloylacridonyl radical and Y is hydrogen.

5. A pyrimidine according to claim 1 of the formula

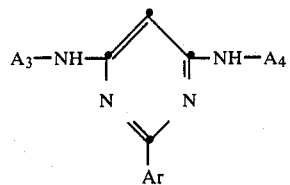

(2)

wherein $A_3$ and $A_4$ are each independently of the other 3,4-phthaloylacridonyl which is attached to —NH— in 2-position and which is unsubstituted or substituted by the substituents as defined in claim 1, or anthraquinonyl which is attached to —NH— in the 1- or 2-position and which is unsubstituted or substituted by the substituents as defined in claim 1.

6. A pyrimidine according to claim 5, wherein $A_3$ and $A_4$ in formula (2) are the 3,4-phthaloylacridonyl radical or a 1-anthraquinonyl radical which is unsubstituted or substituted by halogen, lower alkyl, lower alkoxy, lower alkylcarbonyl or lower alkylcarbonylamino.

* * * * *